(12) United States Patent
Zaugg

(10) Patent No.: US 9,599,205 B2
(45) Date of Patent: Mar. 21, 2017

(54) COVER PLATE SEALED TO STATOR ASSEMBLY

(71) Applicant: Schaeffler Technologies GmbH & Co. KG, Herzogenaurach (DE)

(72) Inventor: Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 180 days.

(21) Appl. No.: 14/524,967

(22) Filed: Oct. 27, 2014

(65) Prior Publication Data

US 2015/0114781 A1    Apr. 30, 2015

Related U.S. Application Data

(60) Provisional application No. 61/896,773, filed on Oct. 29, 2013.

(51) Int. Cl.
*F16H 45/02* (2006.01)
*F16H 41/24* (2006.01)

(52) U.S. Cl.
CPC .......... *F16H 45/02* (2013.01); *F16H 41/24* (2013.01); *F16H 2045/0215* (2013.01); *F16H 2045/0252* (2013.01); *F16H 2045/0263* (2013.01)

(58) Field of Classification Search
CPC .......... F16H 45/02; F16H 2045/0215; F16H 2045/0252; F16H 2045/0263
See application file for complete search history.

(56) References Cited

U.S. PATENT DOCUMENTS

| | | | |
|---|---|---|---|
| 6,217,476 B1 | 4/2001 | Muller et al. | |
| 7,926,635 B2* | 4/2011 | Kombowski | F16D 25/0638 192/3.26 |
| 8,201,674 B2 | 6/2012 | Heeke et al. | |
| 2004/0112698 A1* | 6/2004 | Maienschein | F16H 45/02 192/3.23 |
| 2012/0241271 A1 | 9/2012 | Steinberger et al. | |
| 2013/0056319 A1 | 3/2013 | Lindemann et al. | |
| 2013/0291528 A1 | 11/2013 | Strong et al. | |

OTHER PUBLICATIONS

Written Opinion of the International Searching Authority for corresponding International application PCT/US2014/062453.

* cited by examiner

*Primary Examiner* — Huan Le
(74) *Attorney, Agent, or Firm* — Davidson, Davidson & Kappel, LLC

(57) ABSTRACT

A torque converter for a motor vehicle drive train is provided. The torque converter includes a damper including a first cover plate and a drive flange; and a stator assembly. The first cover plate is sealingly rotatable with respect to the stator assembly at a sealed interface and the first cover plate and the drive flange form a fluid flow gap therebetween. Fluid flows through the fluid flow gap during operation of the torque converter. The sealed interface prevents the fluid from flowing therethrough. A method of forming a torque converter is also provided.

20 Claims, 4 Drawing Sheets

COVER PLATE SEALED TO STATOR ASSEMBLY

This claims the benefit to U.S. Provisional Patent Application No. 61/896,773, filed on Oct. 29, 2013, which is hereby incorporated by reference herein.

The present disclosure relates generally to torque converters and more specifically to dampers and stator assemblies of torque converters.

BACKGROUND

U.S. Pat. No. 6,217,476 and U.S. Publication No. 2013/056319 show turbine hubs sealed to a stator shafts and U.S. Pat. No. 7,926,635 shows an inner race sealed to a stator shaft and a turbine hub.

SUMMARY OF THE INVENTION

A torque converter for a motor vehicle drive train is provided. The torque converter includes a damper including a first cover plate and a drive flange; and a stator assembly. The first cover plate is sealingly rotatable with respect to the stator assembly at a sealed interface and the first cover plate and the drive flange form a fluid flow gap therebetween. Fluid flows through the fluid flow gap during operation of the torque converter. The sealed interface prevents the fluid from flowing therethrough.

A method of forming a torque converter is also provided. The method includes forming a first cover plate for a damper, a drive flange for a damper and a stator assembly and coupling the first cover plate, drive flange and stator assembly together in the torque converter such that the first cover plate and the drive flange form a fluid flow gap therebetween and the first cover plate and the stator assembly form a sealed interface preventing the fluid from flowing therethrough.

BRIEF DESCRIPTION OF THE DRAWINGS

The present invention is described below by reference to the following drawings, in which.

DETAILED DESCRIPTION

The present disclosure provides a manufacturing method for a cover plate that seals to a stator shaft and permits flow between the cover plate and a flange. This avoids costly hub designs with crossing flow paths.

Figure 1:
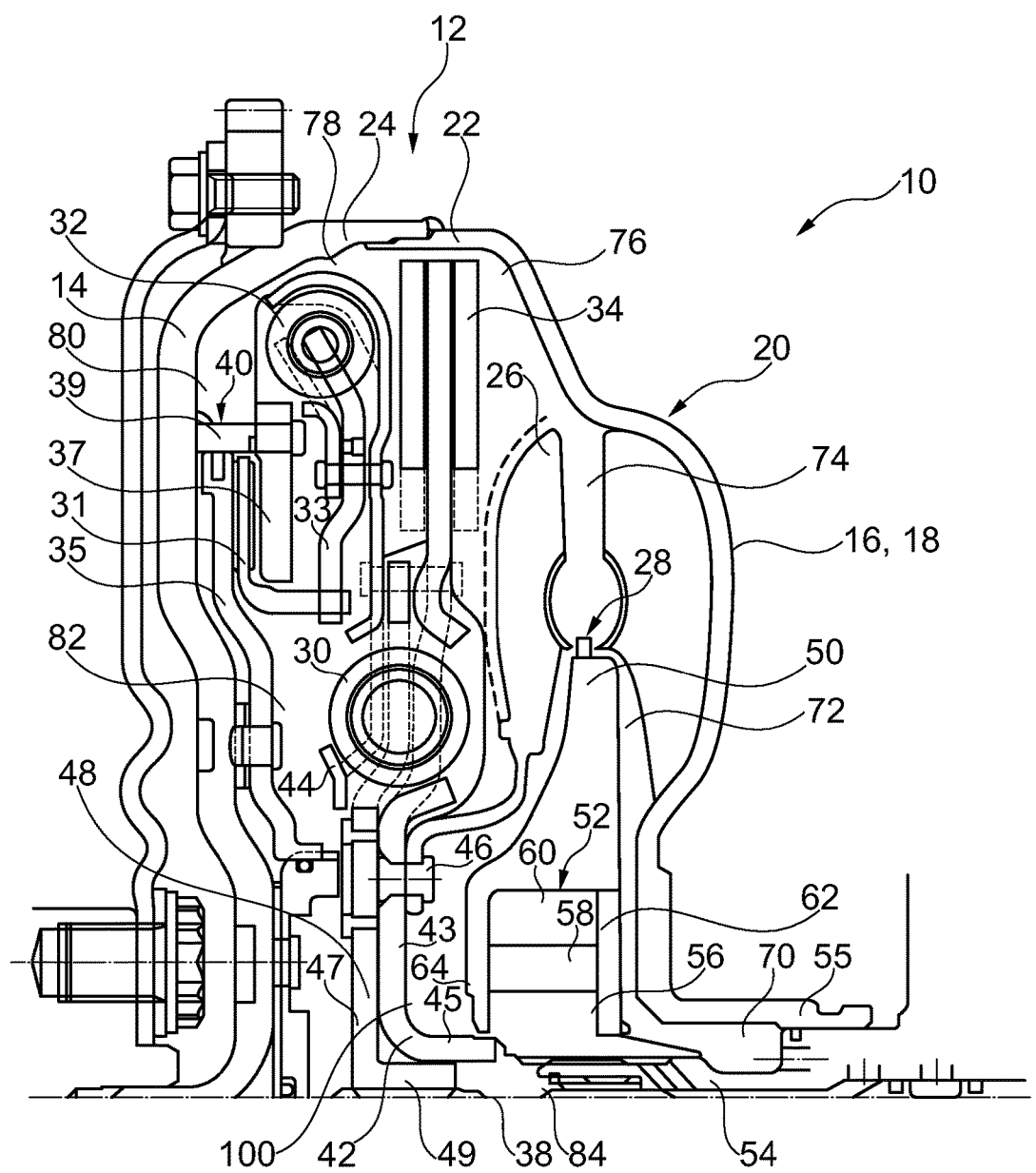
FIG. 1 shows a torque converter including a damper in accordance with an embodiment of the present invention.

FIG. 1 shows a torque converter 10 including a damper 12 in accordance with an embodiment of the present invention. Torque converter 10 includes a front cover 14 for connecting with a crankshaft of a motor vehicle engine and a rear cover 16 forming a shell 18 of an impeller 20. Front cover 14 and rear cover 16 are both substantially cup shaped and are joined by providing an axial extension 22 of rear cover 16 radially inside of an axial extension 24 of front cover 14. Torque converter 10 also includes a turbine 26 opposite of impeller 20 and a stator assembly 28 positioned between impeller 20 and turbine 26. Damper 12 is positioned between front cover 14 and turbine 26 for transferring torque from turbine 26 to a shaft 38, which may be coupled to a drive component, for example a variable-speed transmission. Damper 12 includes damping elements in the form of a radially inner set of springs 30, a radially outer set of springs 32 and a centrifugal pendulum absorber 34. A lock-up clutch 40 is provided between damper 12 and front cover 14 for rotationally connecting turbine 26 and impeller 20 together, via damper 12, when impeller 20 and turbine 26 have the same rotational velocity. As turbine 26 is driven by impeller 12, either through engagement of lock-up clutch 40 or through fluid flow between blades of turbine 26 and blades of impeller 20, turbine 26 transfers torque to damper 12.

Lock-up clutch 40 includes a clutch plate 31 circumferentially engaging a plate 33 that circumferentially engages arc springs 32. A piston plate 35 provided axially inside of front cover 14 is moveable axially toward and away from front cover 14 to engage a friction surface on a first side of a clutch plate 31 and press another friction surface of clutch plate 31, which is on a second side of clutch plate 31 opposite the first side, against a clutch backing plate 37. Clutch backing plate 37 may be fixed to front cover 12 by a connector 39 rigidly fixed to front cover 14. Piston plate 35 is elastically connected to front cover 14 by a leaf spring extending axially between front cover 14 and piston plate 35, causing piston plate 35 to be radially fixed with respect to front cover 14, but axially movable to engage clutch plate 31.

Damper 12 includes a first cover plate 42 and a second cover plate 44 holding and circumferentially driving springs 30 during the operation of torque converter 10. First cover plate 42 and second cover plate 44 are riveted together to retain springs 30. First cover plate 42 also is connected to turbine 26, here by a rivet 46, and is circumferentially driven by turbine 26. Damper 12 also includes a drive flange 48 sandwiched between cover plates 42, 44 for receiving, via springs 30, torque transferred to cover plate 42 from turbine 26. Drive flange 48 in turn transfers the torque to shaft 38. Cover plate 42 includes a radially extending portion 43 extending radially outward from shaft 38 past springs 30 and an axially extending portion 45 extending axially from an inner radial end of radially extending portion 43. Drive flange 48 similarly includes a radially extending portion 47 extending radially outward from shaft 38 past springs 30 and an axially extending portion 49 extending axially from an inner radial end of radially extending portion 47. Axially extending portion 49 is splined to splines of shaft 38.

Stator assembly 28 includes a stator shell 50, a one-way clutch 52 supporting stator shell 50 and a non-rotatable stator shaft 54. An outer radial surface of stator shaft 54 sealing contacts an impeller hub 55, which is rotatable with respect to stator shaft 54. One-way clutch 52 includes an inner race 56 splined to stator shaft 54, a roller element 58 and an outer race 60. Stator shaft 54, roller element 58 and outer race 60 are held in axially in place between a support plate 62 and a stator hub 64. An inner radial surface of inner race 56 is sealingly in contact with an outer radial surface of an axial protrusion 66 of flange 42.

Figure 2:
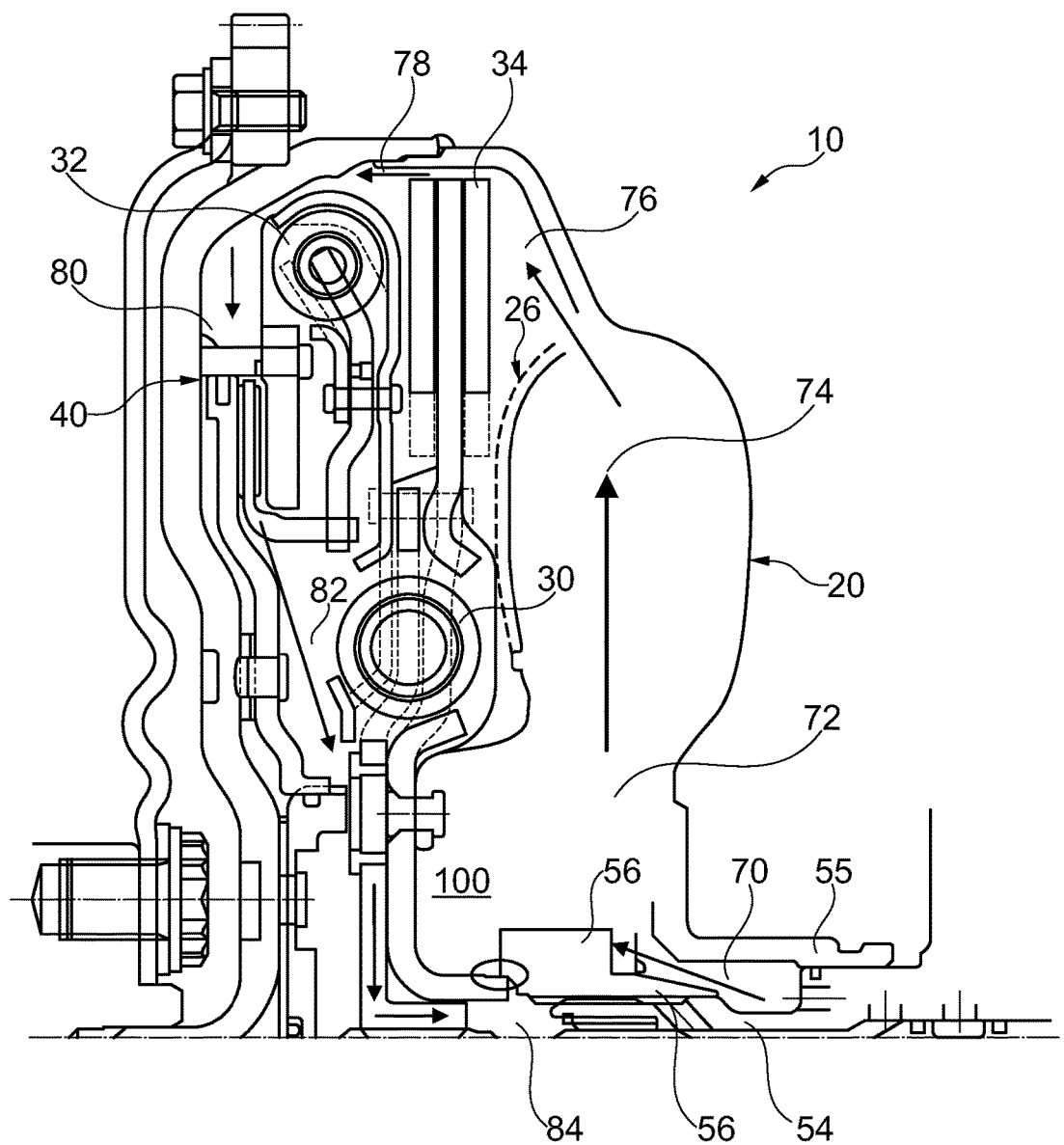
FIG. 2 schematically shows arrows illustrating the flow path of cooling fluid through the torque converter shown in FIG. 1.

FIG. 2 schematically shows arrows illustrating the flow path of cooling fluid through torque converter 10. The flow of cooling fluid begins at an area 70 between stator shaft 54 and impeller hub 55 and flows along a surface of inner race 56 facing impeller 30 and an area 72 in between stator wheel 50 and impeller 20. The cooling fluid next flows through an area 74 between impeller 20 and turbine 26 to an area 76 radially outside of turbine 26. The cooling fluid next flows radially outside of damper 12 to an area 78, specifically flowing around centrifugal pendulum absorber 34 and then arc springs 32. After flowing around arc springs 32, the fluid enters into an area 80 radially outside of lock-up clutch 40, passes through lock-up clutch 40 and into an area 82 between arc springs 30 and front cover 14. In order to allow the fluid to flow through lock-up clutch 40, connector 39 has a hole or slot or clearance with a portion of backing plate 37 and friction rings on clutch plate 31 have flow grooves. The fluid next flows radially inward through a first fluid flow gap 90 (FIG. 3) formed between radially extending portion 43 of cover plate 42 and radially extending portion 47 of drive flange 48, then axially toward stator shaft 54 through a second fluid flow gap 92 (FIG. 3) formed between axially extending portion 45 of cover plate 42 and axially extending portion 49 of drive flange 48 to an area 84.

Figure 3:
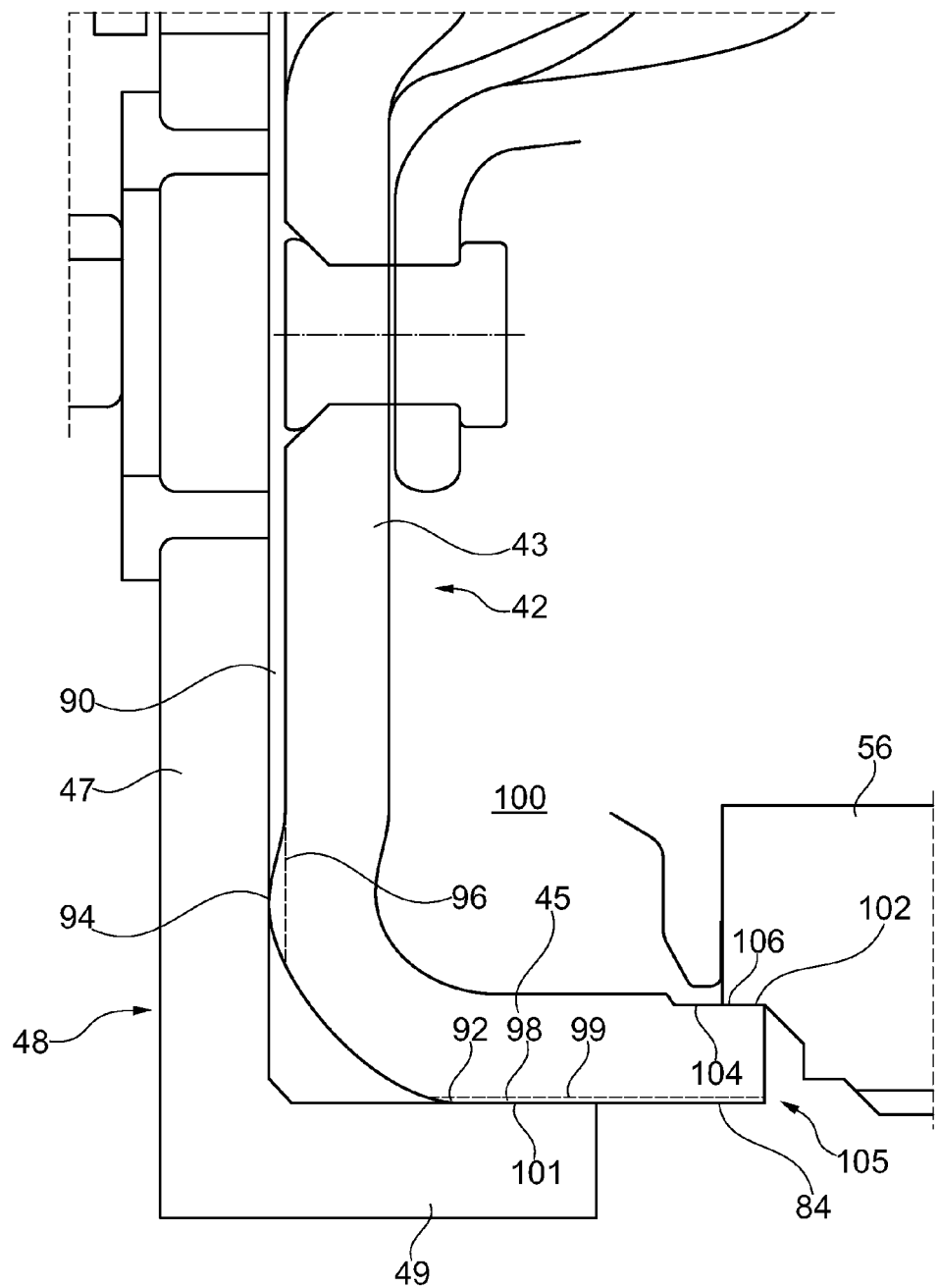
FIG. 3 shows a close up view of a cover plate and a drive flange 48 from the torque converter shown in FIGS. 1 and 2.

FIG. 3 shows a close up view of cover plate 42 and drive flange 48 from FIGS. 1 and 2. As noted above, a radially extending gap 90 is formed between radially extending portion 43 of cover plate 42 and radially extending portion 47 of drive flange 48 and an axially extending gap 92 is formed between axially extending portion 45 of cover plate 42 and axially extending portion 49 of drive flange 48. In order to space radially extending portion 43 a sufficient distance from radially extending portion 47 to form gap 90, radially extending portion 43 is provided with a plurality of axially extending protrusions 94 extending axially from a wall 96 that are circumferentially spaced from each other to allow the fluid to flow radially along radially extending portion 47 between protrusions 94. In order to space axially extending portion 45 a sufficient distance from axially extending portion 49 to form gap 92, axially extending portion 47 is provided with a plurality of radial protrusions 98 extending radially from axially extending grooves 99 that are circumferentially spaced from each other to allow the fluid to flow axially along axially extending portion 49 between protrusions 98. In order to prevent the fluid from flowing to area 84 from an area 100 between stator assembly 28 and cover plate 42, cover plate 42 snugly contacts stator assembly 28 to form a sealed interface 102. Accordingly, the fluid flow path comes into contact with sealed interface 102 after passing through fluid flow gap 92. Specifically, an outer radial surface 104 of a neck 105 at the end of axially extending portion 45 contacts an inner radial surface 106 of inner race 56 to form sealed interface 102. First cover plate 42 is sealingly rotatable with respect to stator assembly 28 at sealed interface 102. Sealed interface 102 may advantageously allow a pressure difference to be generated so that cooling flow will pass through the clutch 40 rather than leak by inner race 56 through a path of lower resistance.

Figure 4A:
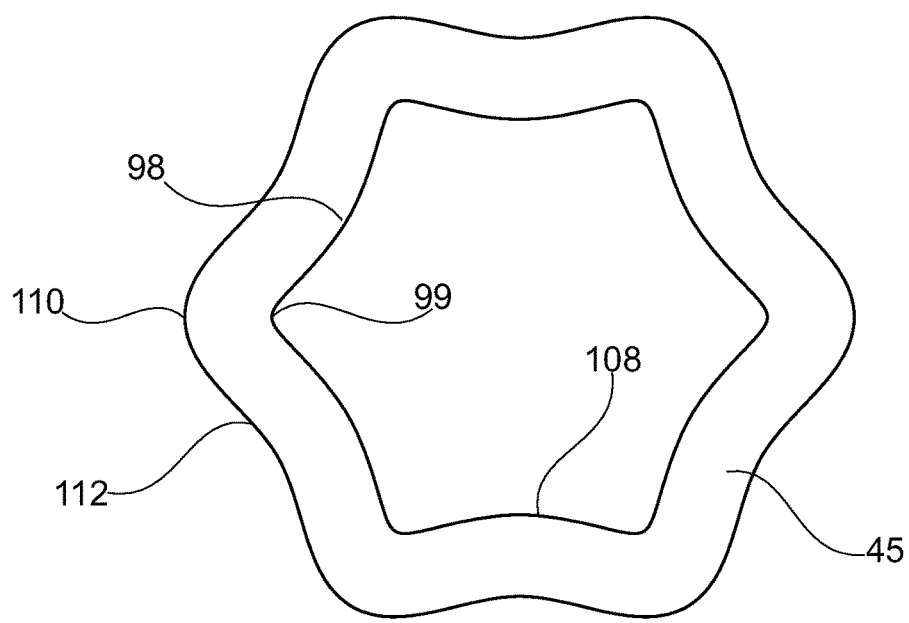
FIGS. 4a and 4b show a method of forming a neck of an axially extending portion of the cover plate.
Figure 4B:
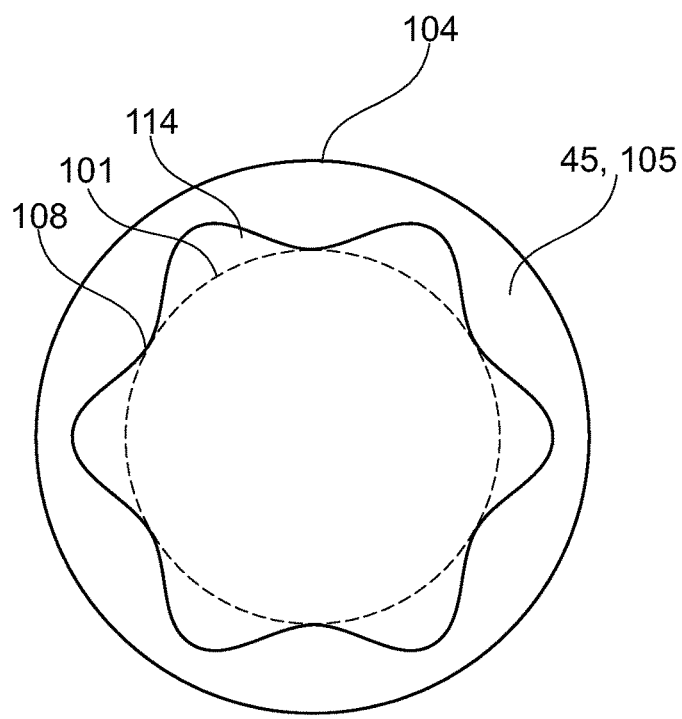

FIGS. 4a and 4b show a method of forming neck 105 of axially extending portion 45 of cover plate 42. FIG. 4a shows axially extending portion 45 including a uniform thickness. Axially extending portion 45 is shaped to include radial protrusions 98 protruding with respect to grooves 99 on an inner radial surface 108 thereof and similarly shaped radially extending protrusions 110 on an outer radial surface 112 thereof. Accordingly, FIG. 4a shows axially extending portion 45 including inner radial surface 108 having a varying diameter and outer radial surface 112 having a varying diameter. FIG. 4b shows axially extending portion 45 after the end of axially extending portion 45 has been modified to form neck 105. Radially extending protrusions 110 on the outer surface 112 have been machined off or coined to form a cylindrical outer surface 104 for forming sealed interface 102 with inner radial surface 106 of inner race 56. Accordingly, FIG. 4b shows axially extending portion 45 including inner radial surface 108 having a varying diameter and outer radial surface 104 having a constant diameter because the machining removes grooves 99 and protrusions 98 from the outer radial surface. As shown schematically in FIG. 4b, protrusions 108 may contact outer surface 101 of axially extending portion 49 of drive flange 48 to form a plurality of axially extending channels 114 that define flow gap 92.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter for a motor vehicle drive train comprising:
   a damper including a first cover plate and a drive flange; and
   a stator assembly, the first cover plate being sealingly rotatable along the stator assembly at a sealed interface, the first cover plate and drive flange forming a fluid flow gap therebetween, fluid flowing through the fluid flow gap during operation of the torque converter, the sealed interface preventing the fluid from flowing therethrough.

2. The torque converter as recited in claim 1 wherein the damper further includes a second cover plate and a plurality of springs, the first cover plate and the second cover plate holding the springs therebetween, the drive flange being between the first cover plate and the second cover plate and driving the springs.

3. The torque converter as recited in claim 1 further comprising a turbine and an impeller, the stator assembly being between the turbine and the impeller.

4. The torque converter as recited in claim 3 further comprising a lock-up clutch, the fluid flowing in a path from between the turbine and the impeller, around the damper, through the lock-up clutch and into the fluid flow gap.

5. The torque converter as recited in claim 1 wherein the first cover plate includes an axially extending flange, an end of the axially extending flange forming the sealed interface with the stator assembly.

6. The torque converter as recited in claim 5 wherein an inner radial surface of the axially extending flange is shaped to define the fluid flow gap with the drive flange.

7. The torque converter as recited in claim 6 wherein the inner radial surface has a varying diameter.

8. The torque converter as recited in claim 7 wherein the inner radial surface includes a plurality of protrusions contacting the drive flange and grooves, each of the grooves being formed between two of the protrusions, the grooves defining channels forming the fluid flow gap.

9. A method of forming a torque converter for a motor vehicle comprising:
   forming a first cover plate for a damper, a drive flange for the damper and a stator assembly and coupling the first cover plate, drive flange and stator assembly together in the torque converter such that the first cover plate and the drive flange form a fluid flow gap therebetween and the first cover plate and the stator assembly form a sealed interface preventing the fluid from flowing therethrough.

10. The method as recited in claim 9 wherein the forming the first cover plate includes providing grooves on an inner radial surface of an axial extension of the first cover plate, the grooves defining the fluid flow gap with the drive flange.

11. The method as recited in claim 9 wherein the forming the first cover plate includes providing an outer radial surface of an axial extension of the first cover plate, the outer radial surface having a constant diameter and defining the sealed interface with the stator assembly.

12. The method as recited in claim 9 wherein the coupling the first cover plate, drive flange and stator assembly together in the torque converter includes:
  placing the drive flange and a plurality of springs spaced circumferentially within the drive flange between the first cover plate and a second cover plate,
  riveting the first cover plate and second cover plate together, and
  sliding an inner race of the stator assembly onto an axially extending flange of the first cover plate to form the sealed interface.

13. The method as recited in claim 9 wherein after the coupling the first cover plate, drive flange and stator assembly together in the torque converter, a fluid flow is formed extending from between a turbine and an impeller of the torque converter, around the damper, through a lock-up clutch of the torque converter and into the fluid flow gap.

14. The method as recited in claim 13 wherein the fluid in the fluid flow path comes into contact with the sealed interface after passing through the fluid flow gap.

15. The method as recited in claim 9 wherein the forming the first cover plate includes:
  forming the first cover plate to include a radially extending portion and an axially extending portion axially extending from an end of the radially extending portion, the axially extending portion including an inner radial surface having a varying diameter and an outer radial surface having a varying diameter;
  machining the outer radial surface having the varying diameter such that the outer radial surface has a constant diameter.

16. The method as recited in claim 15 wherein the outer radial surface having the varying diameter includes a plurality of axially extending grooves and radial protrusions, each of the grooves being between two of the protrusions, the machining removing the grooves and protrusions from the outer radial surface.

17. The method as recited in claim 16 wherein before the machining the axially extending flange has a constant thickness and after the machining the axially extending flange has a varying thickness.

18. A torque converter for a motor vehicle drive train comprising:
  a damper including a first cover plate and a drive flange; and
  a stator assembly including a one-way clutch, the first cover plate being sealingly rotatable with respect to the stator assembly at a sealed interface formed by the first cover plate and the one-way clutch, the first cover plate and drive flange forming a fluid flow gap therebetween, fluid flowing through the fluid flow gap during operation of the torque converter, the sealed interface preventing the fluid from flowing therethrough.

19. The torque converter as recited in claim 18 wherein the first cover plate includes an axially extending flange having an outer cylindrical surface, the outer cylindrical surface contacting the one-way clutch to form the sealed interface.

20. The torque converter as recited in claim 19 wherein the one-way clutch includes an inner race, the outer cylindrical surface contacting the inner race to form the interface.

* * * * *